Jan. 11, 1955   P. L. ALSPAUGH ET AL   2,699,328
MINING PROCESS AND SYSTEM BY REMOTE CONTROL
Filed April 2, 1949   14 Sheets-Sheet 1

INVENTORS
Paul L. Alspaugh
John W. Heimaster
Roy L. McNeill
BY
D.C. Harrison
ATTORNEY INVENTORS
Paul L. Alspaugh
John W. Heimaster
Roy L. McNeill Jan. 11, 1955  P. L. ALSPAUGH ET AL  2,699,328
MINING PROCESS AND SYSTEM BY REMOTE CONTROL
Filed April 2, 1949  14 Sheets-Sheet 3

INVENTORS
Paul L. Alspaugh
John W. Heimaster
Roy L. McNeill
BY D.C. Harrison
ATTORNEY

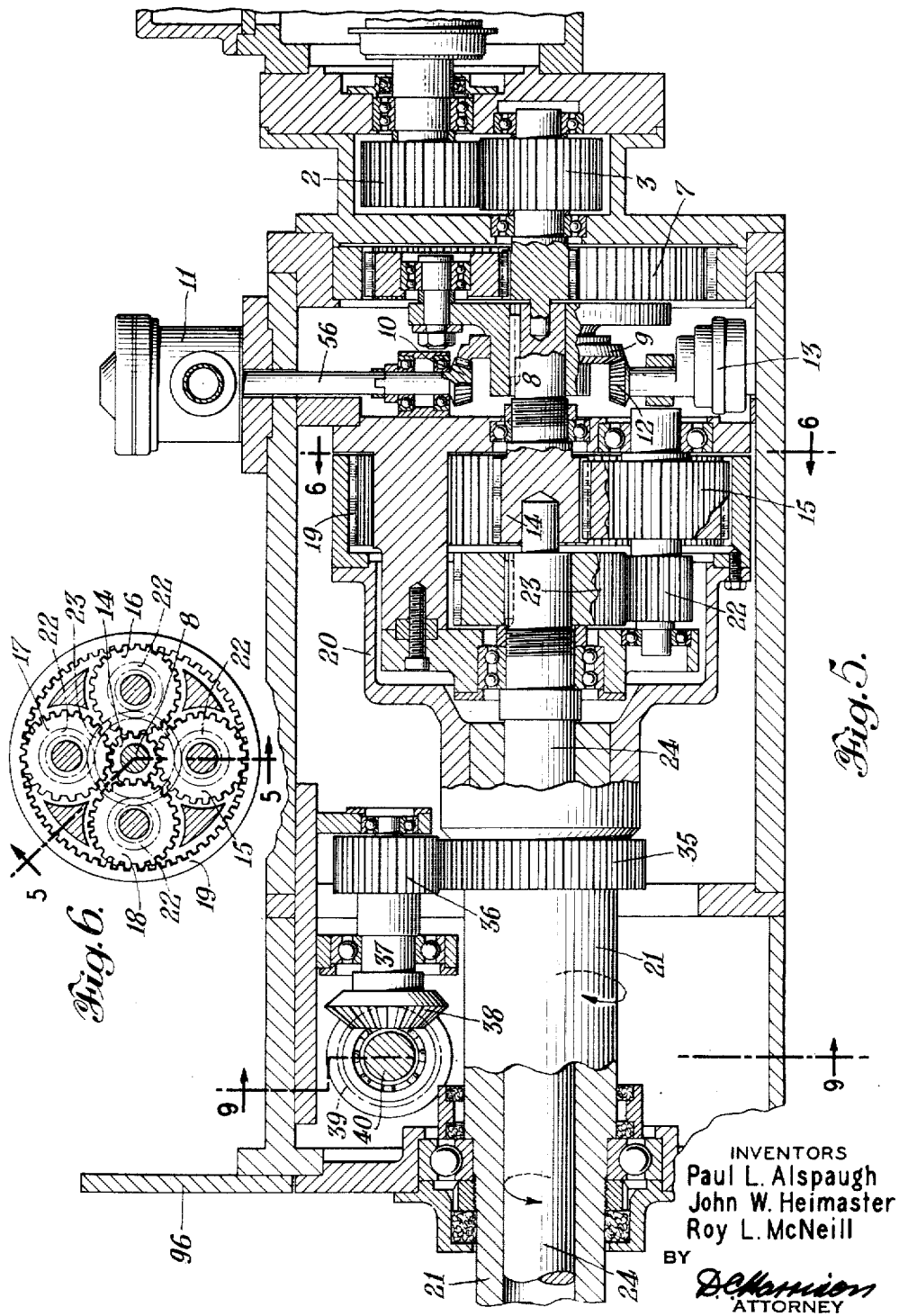

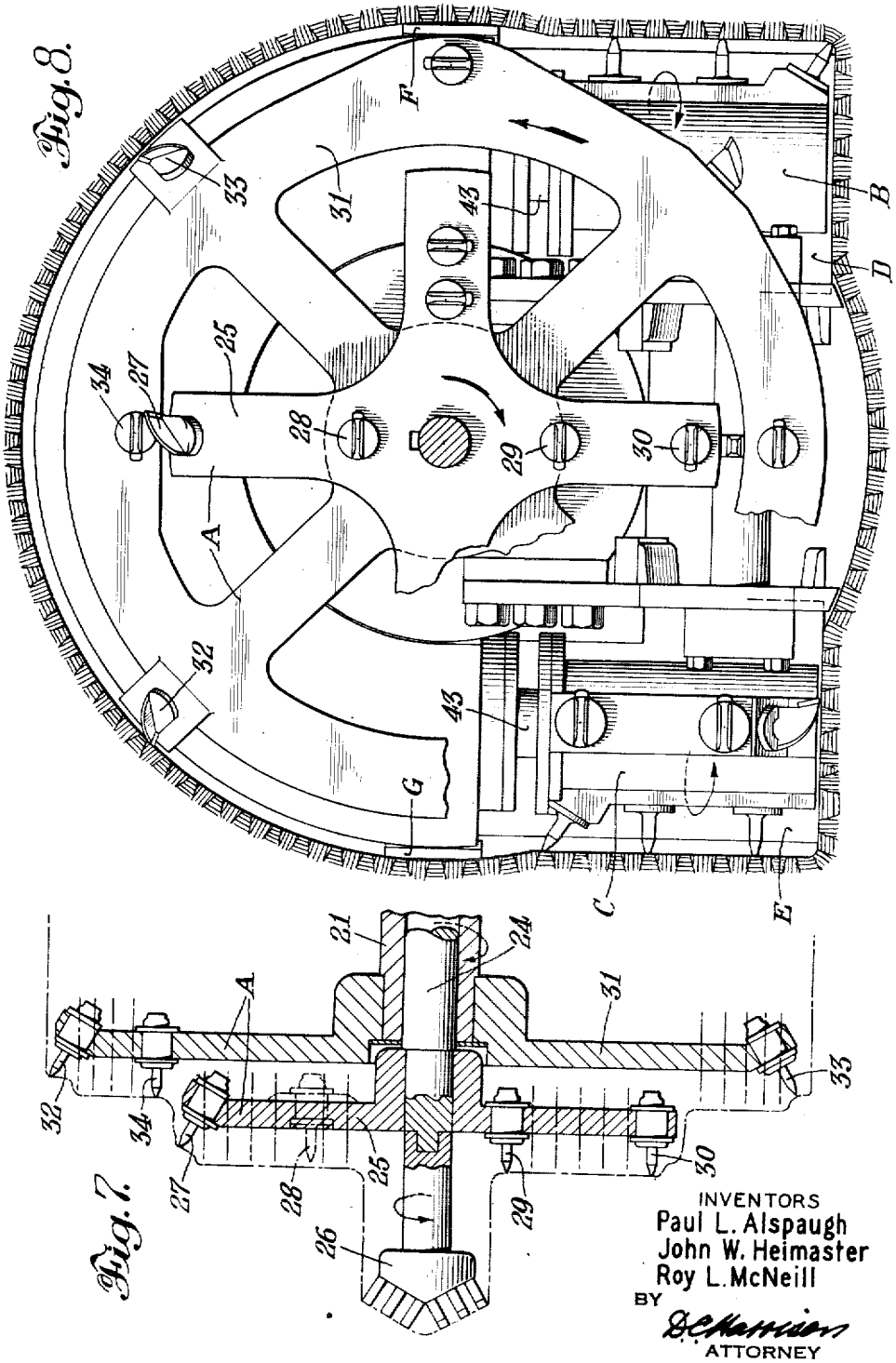

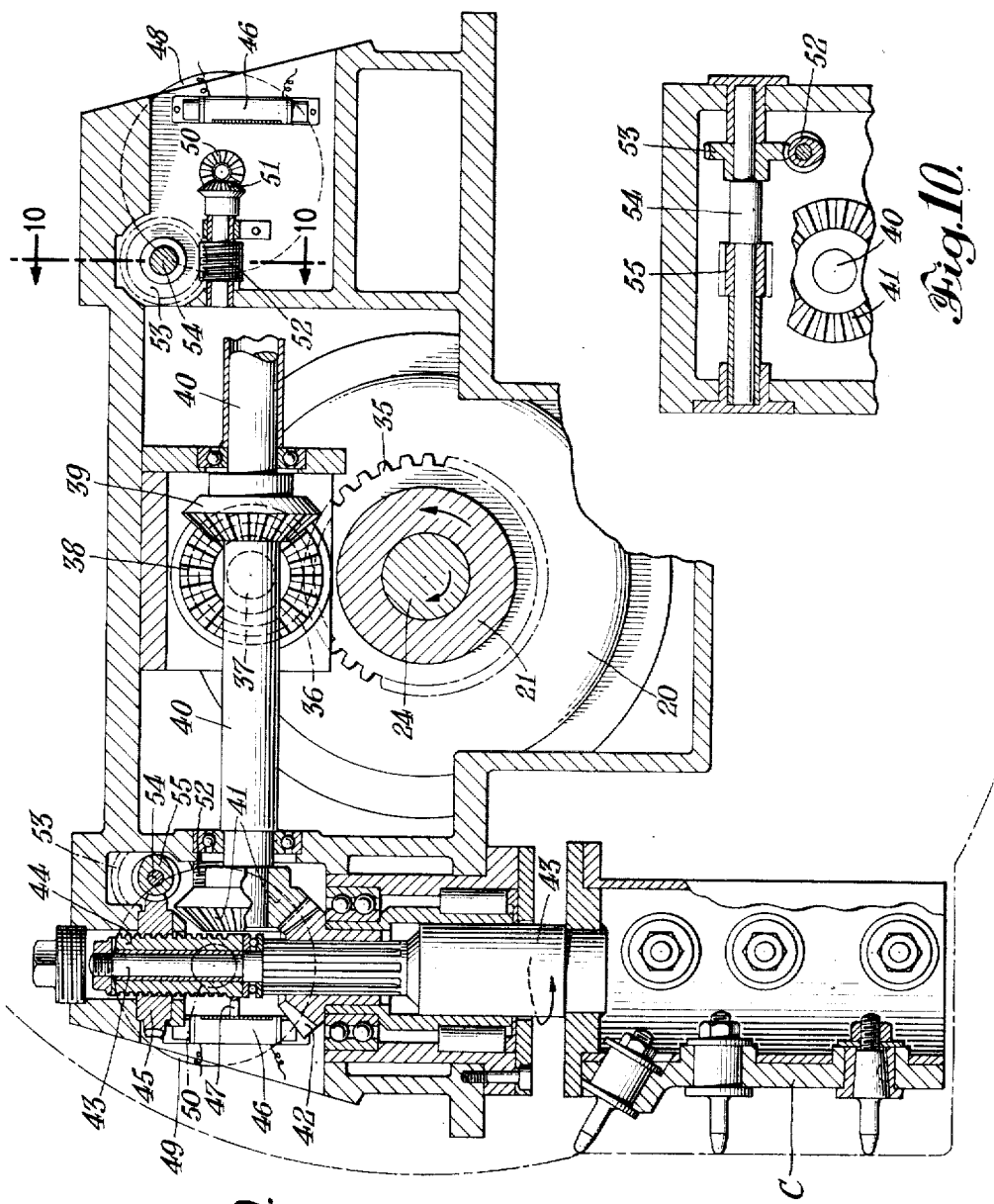

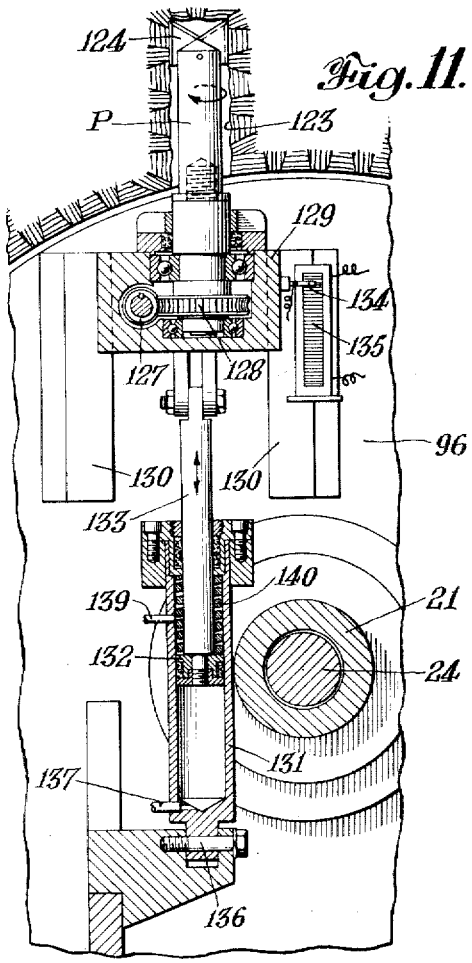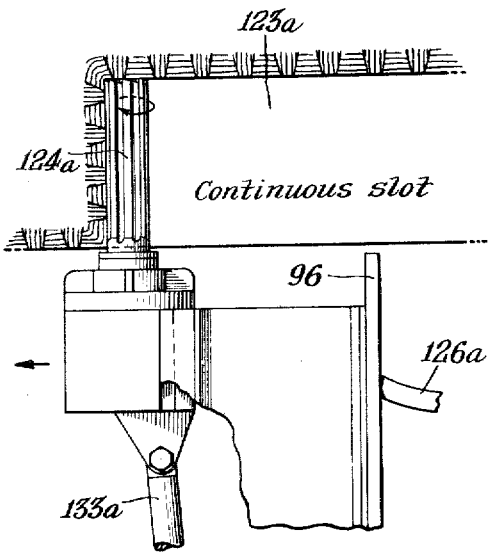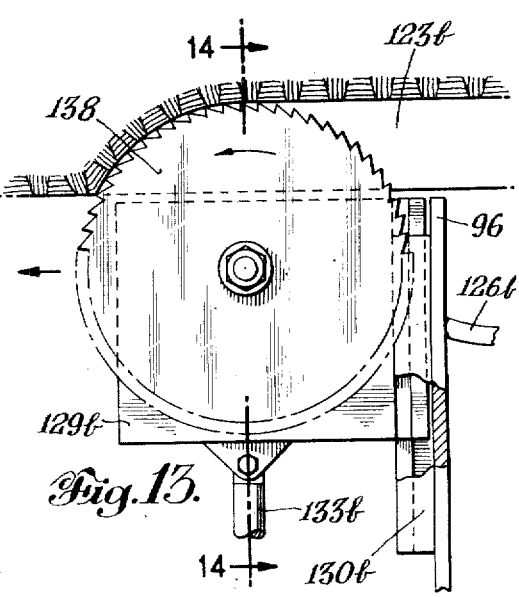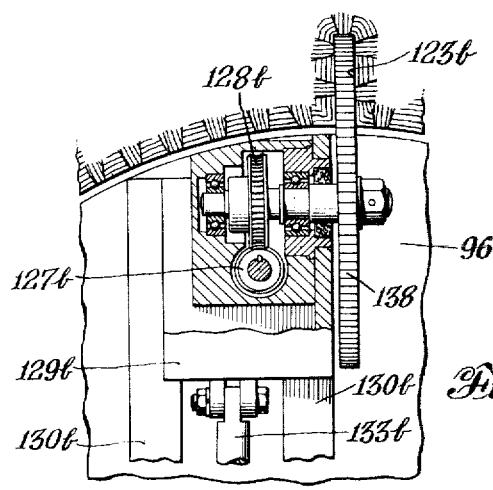

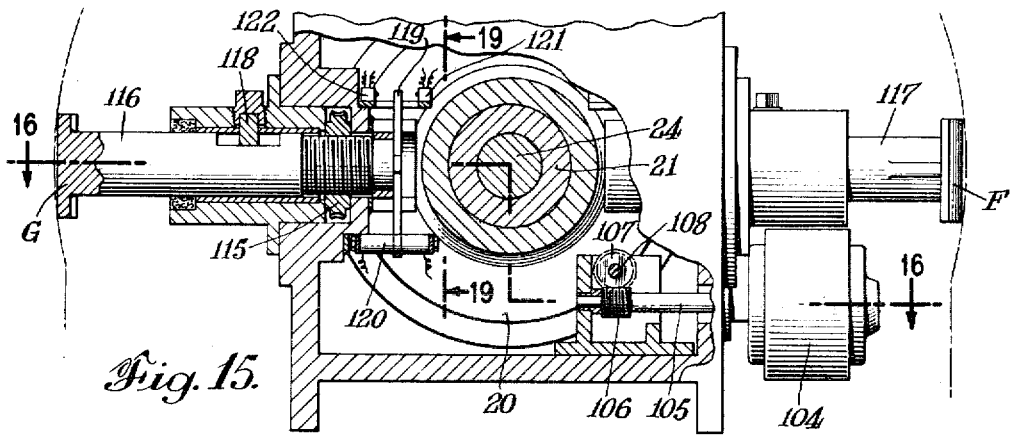
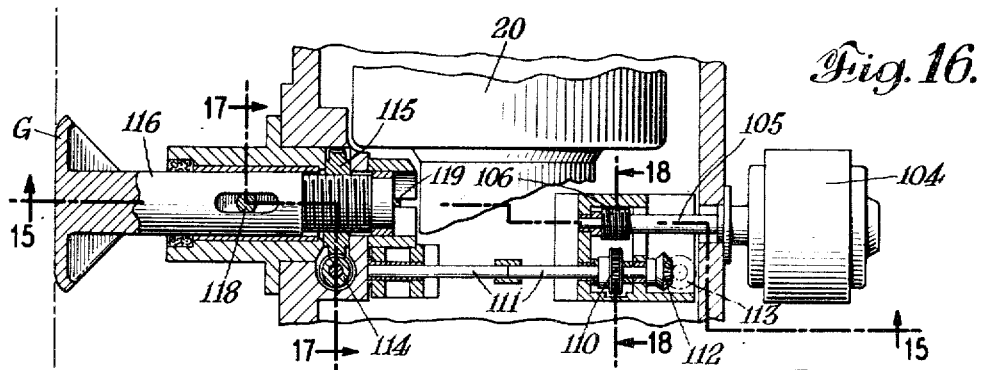
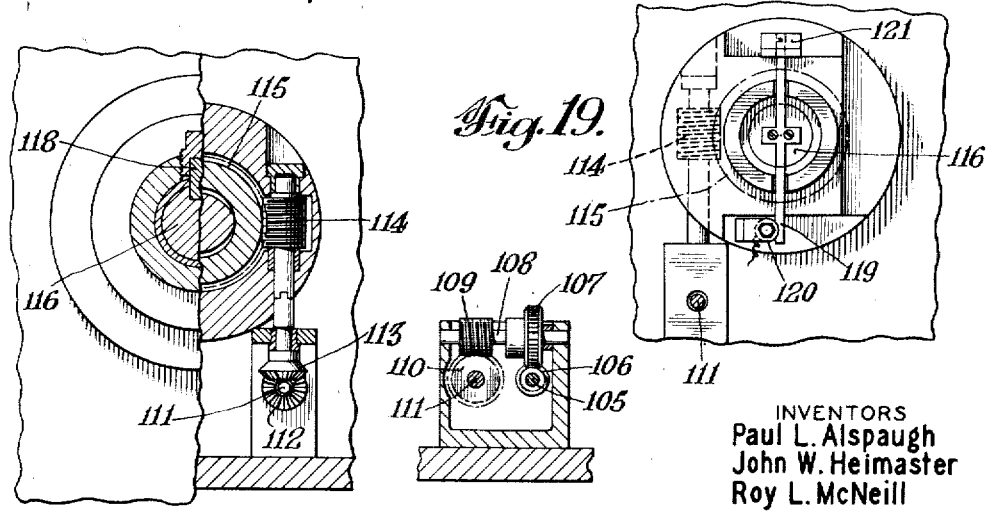

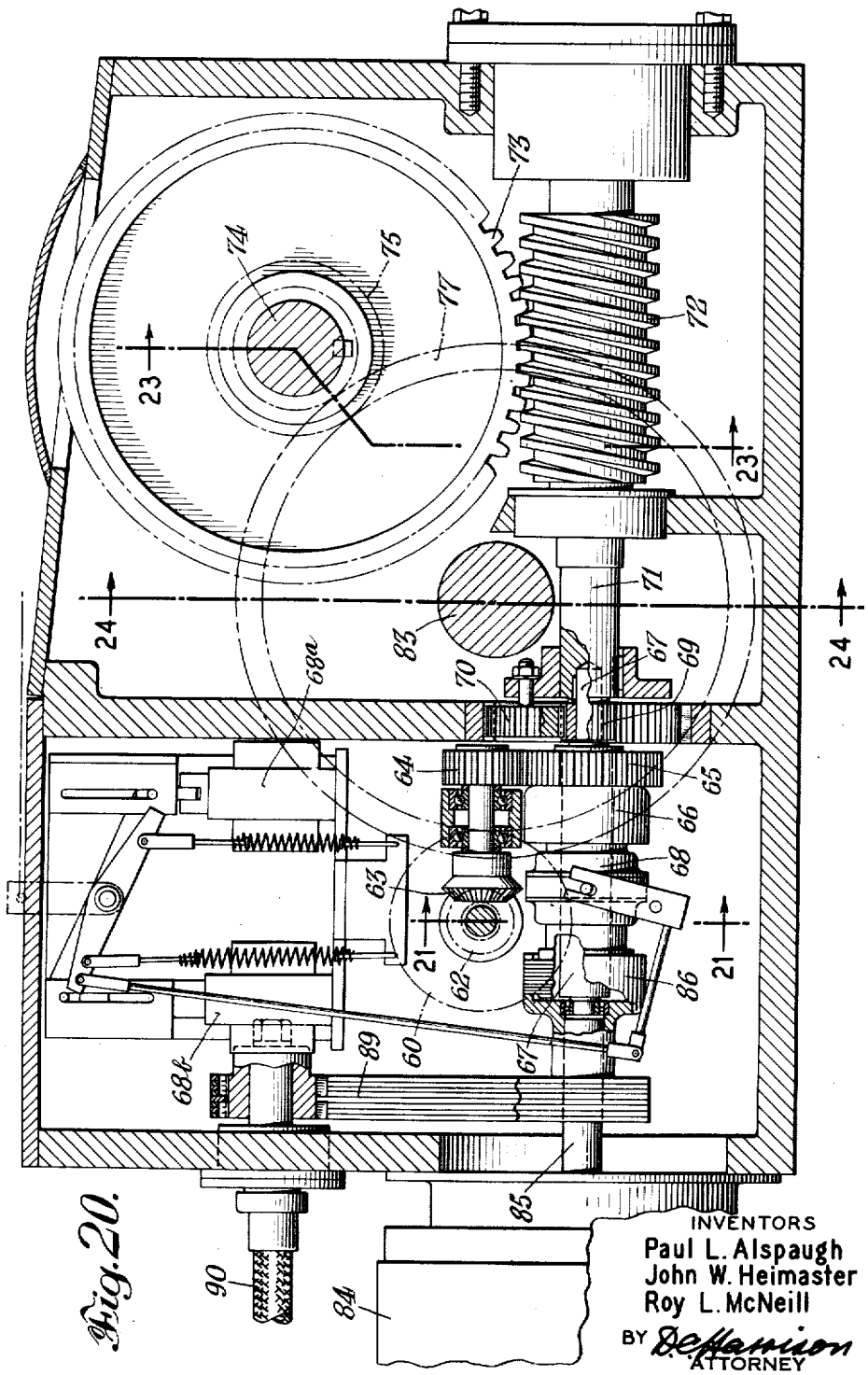

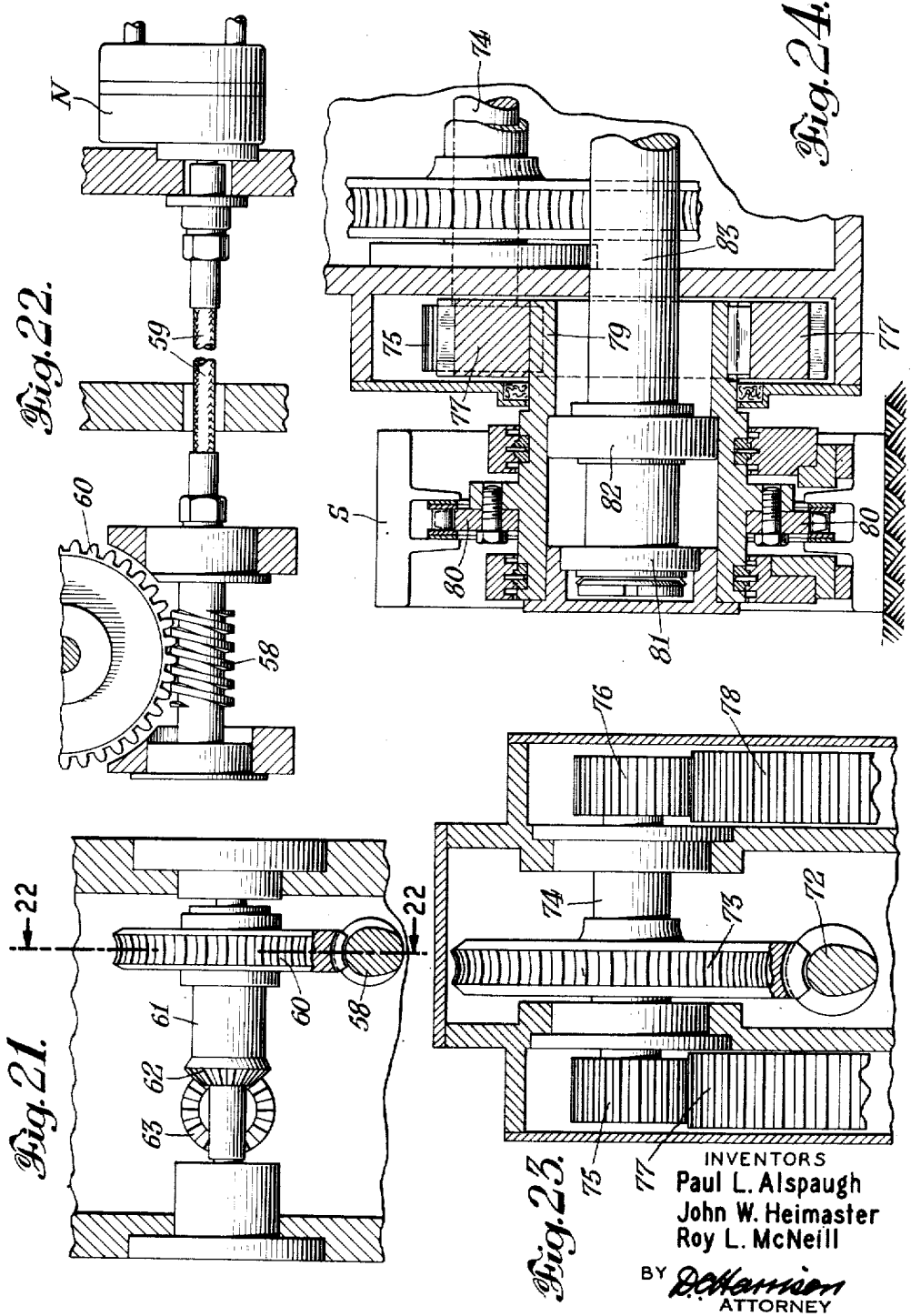

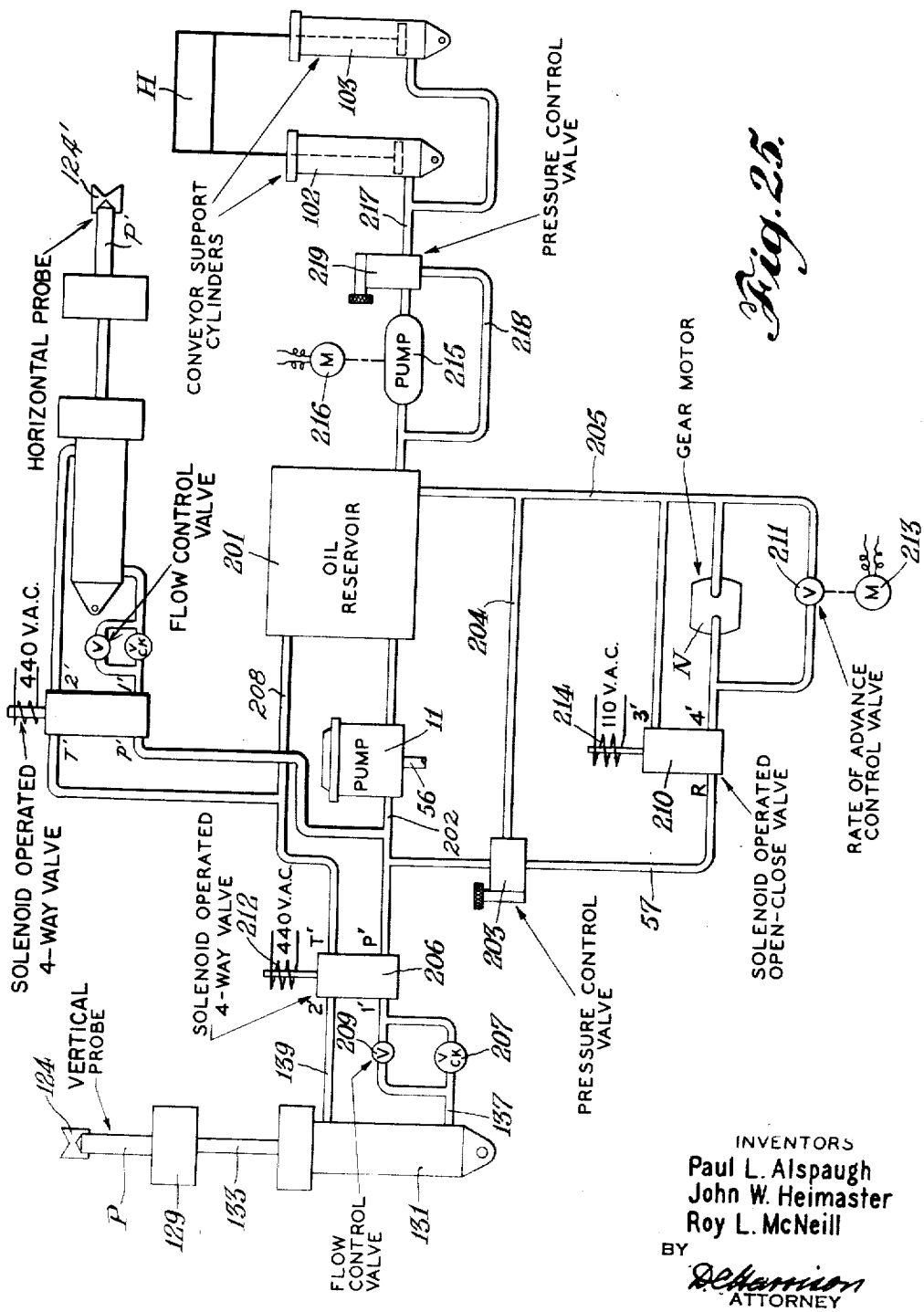

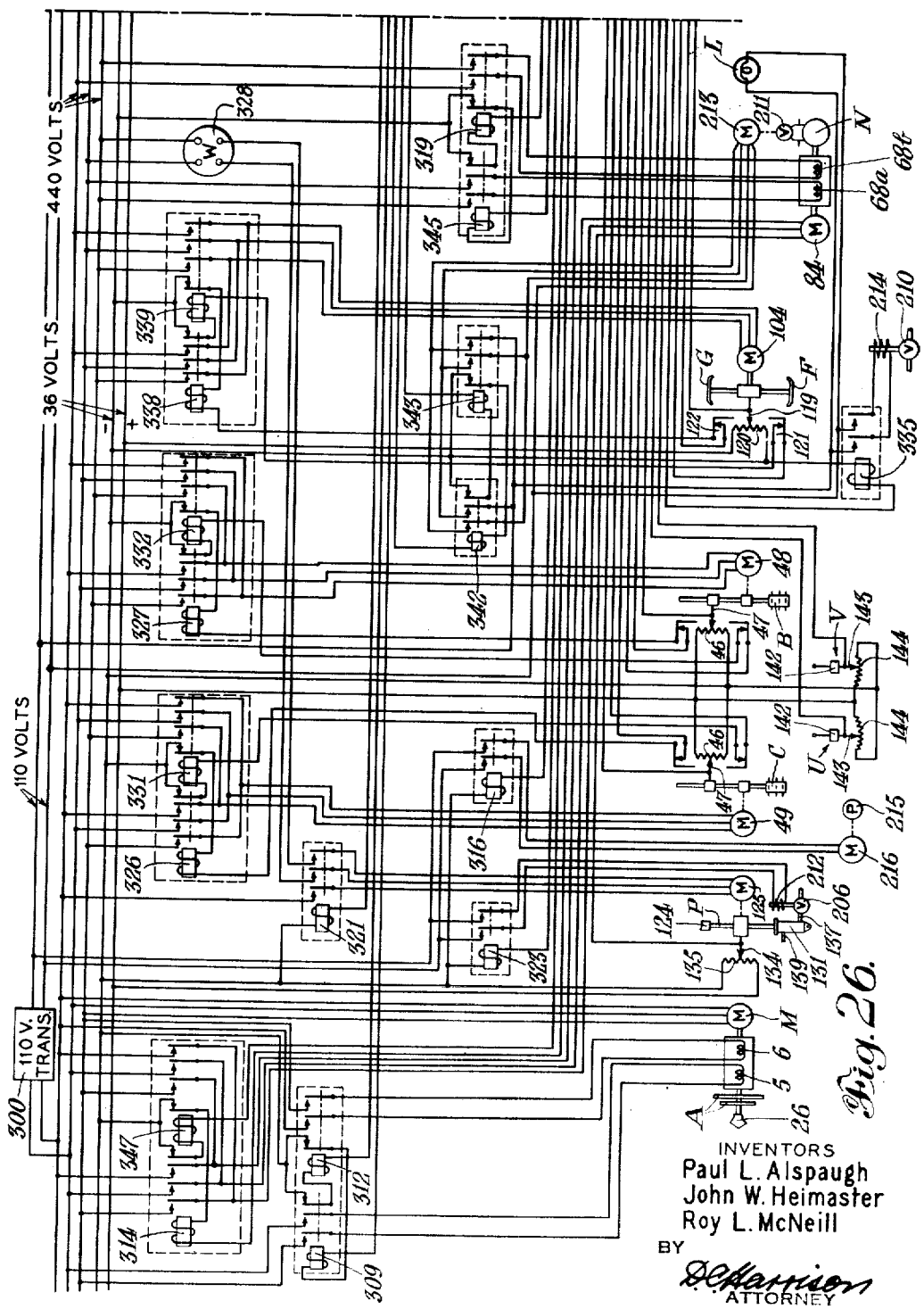

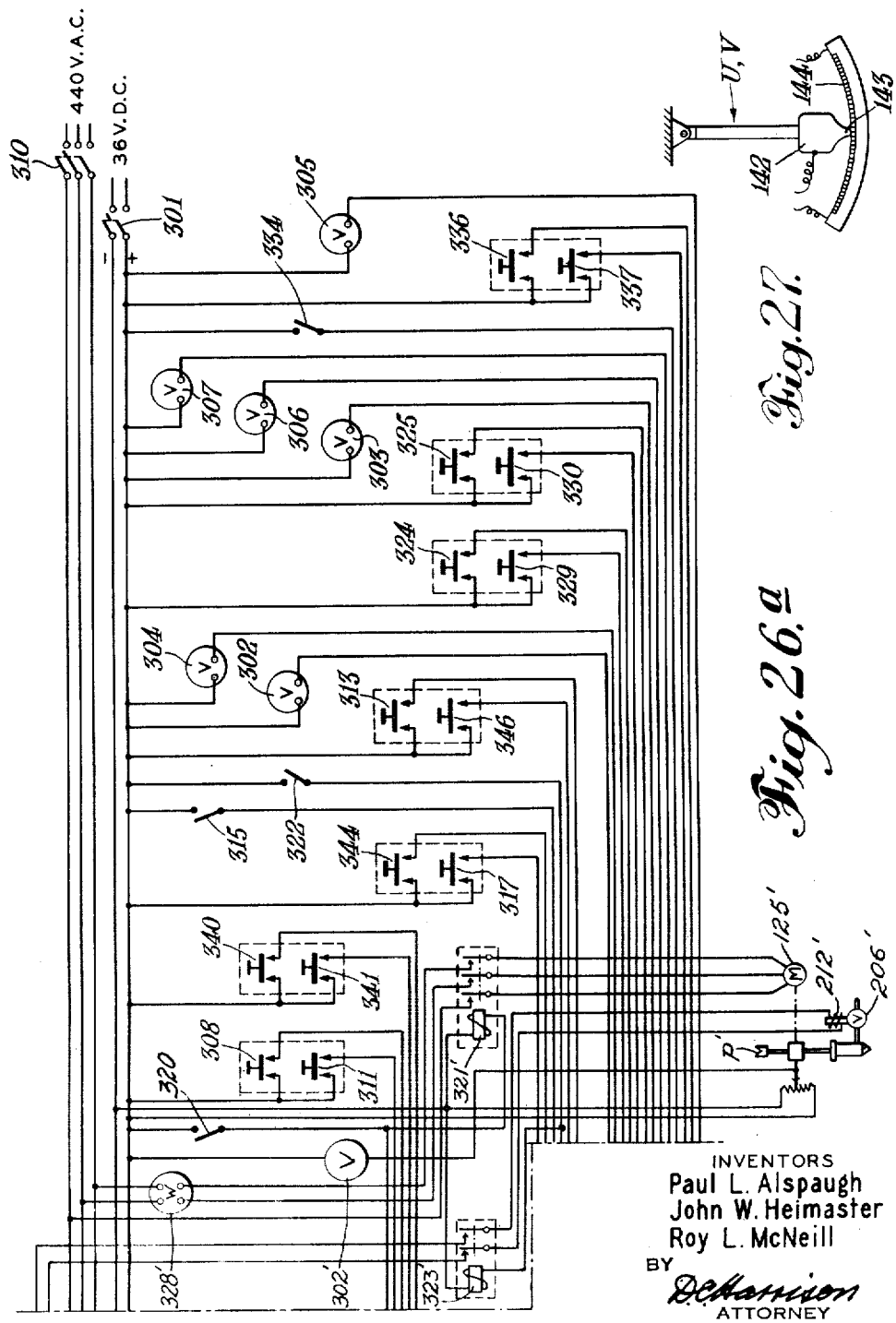

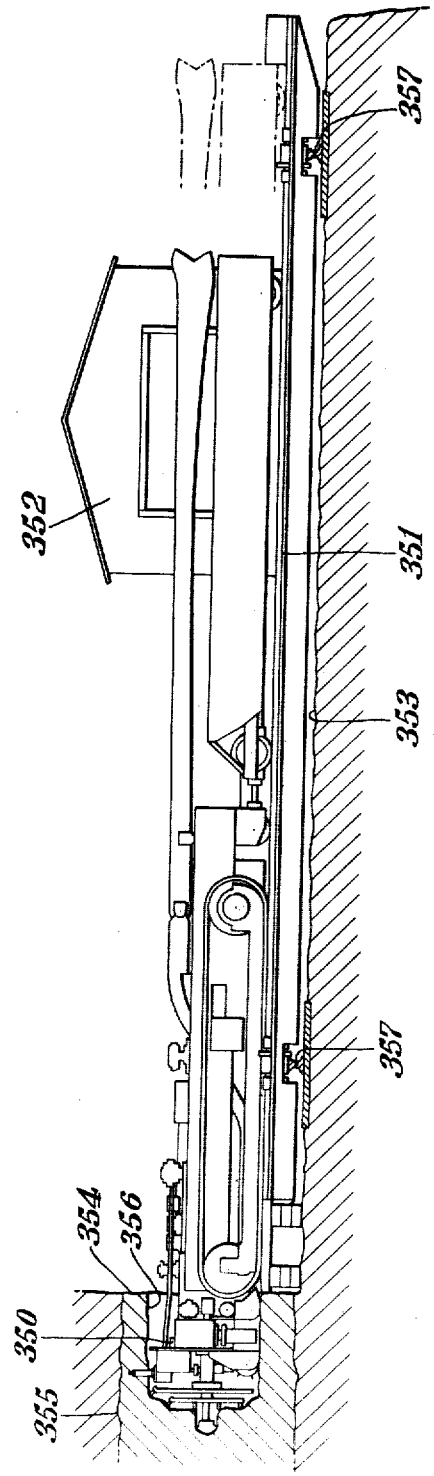

United States Patent Office 2,699,328
Patented Jan. 11, 1955

2,699,328

MINING PROCESS AND SYSTEM BY REMOTE CONTROL

Paul L. Alspaugh and John W. Heimaster, South Charleston, and Roy L. McNeill, Charleston, W. Va., assignors, by mesne assignments, to Union Carbide and Carbon Corporation, a corporation of New York Application April 2, 1949, Serial No. 85,222

18 Claims. (Cl. 262—26)

Coal mining by hand tools is laborious, dangerous and slow. Cutting and boring machines have been used to replace the hand pick, and conveying machines to replace the hand shovel. These machines very considerably increase the output of coal per man per day and materially ease the burden of hand labor; but they do not decrease the dangers of mining, and the only substantial improvements in this latter respect have been achieved by enforcing many safety measures. Developments in coal mining have, in general, been towards greater cutting and handling capacity rather than towards greater safety for the miner.

According to the present invention there is provided a novel system of mining comprising a remotely controlled, self-propelled mining machine together with means for transporting the material, such as coal, being mined by the machine to a desired place. The system is controlled from a control station that is remotely located with respect to the machine. Means are provided for transmitting signals responsive to position-determining means carried by the machine to means at such station responsive to such signals. Means are provided at such station for controlling steering means associated with the machine, to cause the machine to follow a selected course based upon the information supplied by such machine position determining means.

There is also provided in accordance with our invention a novel process of mining selected underground strata of earth material, such as coal, which comprises boring into such material and forming a bore hole with an advancing bore hole end face. The resulting borings from such face are removed through the bore hole to a point outside thereof. While the end face of the bore hole is within the strata, the relative position of the bore hole end face with respect to an adjacent boundary of the strata of earth material being mined, is automatically determined substantially at the end face of the bore hole, and signaled to a remote control station outside of such bore hole. The direction of advance of the bore hole end face is thereupon controlled from the control station during the boring operation in accordance with such signals.

The present invention attacks the problem of coal mining from the point of view that maximum safety is achieved when no man is required to enter the area where coal is being removed. As well as saving lives, the absence of men at the working face obviates the necessity to take safety precautions, to use pit props, and to provide extensive ventilation and drainage facilities. These are costly items in conventional mining practices and at best fall far short of providing safe and favorable working locations and conditions. Thus, the possibility of wholly new coal mining methods is opened.

To achieve this general purpose and at the same time achieve a large output of mined coal per hour, we have invented a coal mining machine and auxiliary equipment which permit operation, control, and guidance of the machine from a point remote from its working location at a coal face. The machine cuts coal at a rate and in a direction under the constant control of a remote operator, and delivers the cut coal near the control point. At all times, the operator is aware of the location of the machine with respect to a boundary of the coal seam, its rate of travel, and its inclination in a longitudinal and transverse plane. Through these indications he is also able to judge this control, and in the event of mechanical failure can retrieve the machine without entering the area being mined.

Although most coal seams are nearly horizontal or at a small angle to level, both the floor and roof of the seam may change pitch along any given line. The machine of this invention provides means for apprising the operator of such changes in pitch and means whereby he can adjust the direction of travel of the machine to follow a course roughly parallel to either the roof or the floor of the same, or to an adjacent bore-hole.

To be of wide utility, a coal mining machine must be compact enough to operate in narrow seams and to permit the withdrawal of cut coal at a rapid rate through the bore cut by the machine. The machine of this invention is extremely compact, yet it cuts and delivers coal at a satisfactory rate, for instance, 900 pounds or more per minute for a machine about three feet high, three feet wide and about thirty-one feet long overall.

For convenience of description and ease of understanding the invention, the following description takes up the major features of the invention under separate topics, but it will be apparent that the features all cooperate to produce a unitary result. The topics are introduced in the following order: general arrangement of parts, cutting mechanism, propelling the machine, conveying cut coal, guiding in a vertical plane, guiding in a horizontal plane, determining position relative to roof, hydraulic system, electrical system, operation, and advantages.

Referring to the drawings:

Fig. 3 is a top plan view of the front portion of the machine shown in Fig. 2;

Fig. 3a is the top plan view of the rear portion of the machine shown in Fig. 2a;

Fig. 4 is the side elevation partly in section of the main driving mechanism for operating the main cutters;

Fig. 5 is a vertical longitudinal section of the transmission mechanism driven by the motor of Fig. 4 with the gear box shown in Fig. 6 sectioned along the line 5—5.

Fig. 6 is a section on the line 6—6 of Fig. 5;

Fig. 7 is a section through the oppositely rotating front cutter A;

Fig. 8 is a front elevation of the forward end of the machine showing the front cutters A and the drum cutters B and C behind the front end face cutters A, and illustrates the shape of the hole cut by the machine.

Fig. 9 is a section on the line 9—9 of Fig. 5;

Fig. 10 is a section on the line 10—10 of Fig. 9;

Fig. 11 is a section showing the probe drill on the line 11—11 of Fig. 2;

Fig. 12 shows a modified construction of probe cutter;

Fig. 13 illustrates still another type of probe cutter;

Fig. 14 is a section on the line 14—14 of Fig. 13;

Fig. 15 is a section on the line 15—15 of Fig. 16, showing the forward horizontal guide shoes and adjusting mechanism therefor;

Fig. 16 is a section on the line 16—16 of Fig. 15;

Fig. 17 is a section on the line 17—17 of Fig. 16;

Fig. 18 is a section on the line 18—18 of Fig. 16;

Fig. 19 is a section on the line 19—19 of Fig. 15;

Fig. 20 is a longitudinal section through the rear gear box variable speed endless track and conveyor drive mechanism on line 20—20 of Fig. 3a;

Fig. 21 is a section taken along the line 21—21 of Fig. 20;

Fig. 22 is a section taken along the line 22—22 of Fig. 21, showing the slow speed hydraulic motor drive;

Fig. 23 is a section taken along the line 23—23 of Fig. 20 showing the tractor driving gears;

Fig. 24 is a section taken along the line 24—24 of Fig. 20 showing the treads and gears for driving same;

Fig. 25 is a diagrammatic representation of the hydraulic system for the machine;

Figure 1:
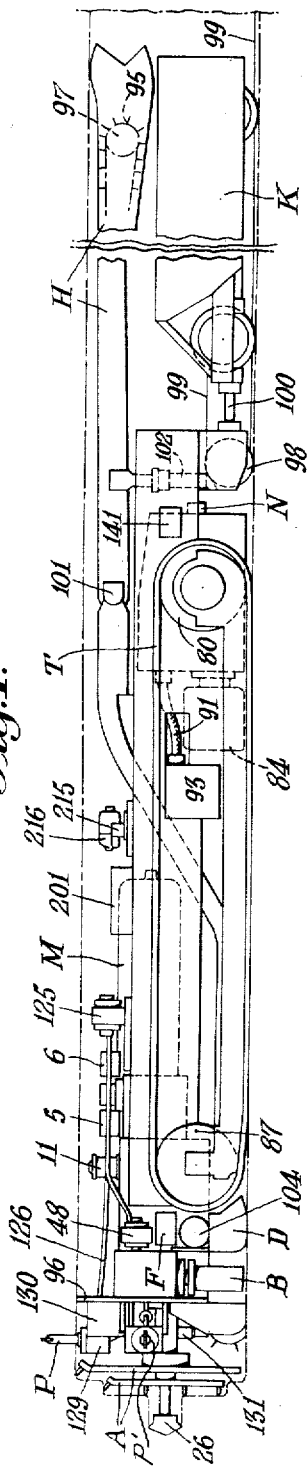
Fig. 1 is a side elevation of a mining machine embodying this invention, showing the general relation of the major parts.

Fig. 26 and Fig. 26a taken together are an electrical diagram of the machine;

Fig. 27 is a pendulum type of tilt indicator; and

Fig. 28 shows a platform for holding the mining machine for movement to a position laterally of the hole just cut and for beginning the cutting of a new hole.

General arrangement of parts

Referring particularly to Figs. 1, 2, 2a, 3 and 3a, the mining machine of this invention includes a pair of oppositely rotatable front-end face cutters A, behind which are a pair of drum cutters B and C arranged to enlarge the lower portion of the circular hole cut by the front cutters A to form a substantially flat-floored hole with partially parallel side walls. A main motor M, controlled from outside the hole cut by this machine, drives the cutters A, B, and C. The drum cutters B and C are individually adjustable in height in response to remote control to direct the travel of the machine in a vertical plane, in the following way: a support shoe D and E on each side adjacent the front of the machine rides on the bottom of the hole along the paths made by the drum cutters B and C, and the machine is so balanced that it tilts in a vertical plane about its rear axle as those paths are higher or lower. Guide shoes F and G engage the side walls of the hole being cut, are movable in unison to the right or to the left, and are operable from outside the hole to shift the forward end of the machine laterally for turning in a horizontal plane during the cutting operation. The main body of the machine is supported on endless treads S and T, which may be driven either forward or backward. The forward thrust during cutting is derived from a hydraulic motor N driven by a pump supplied with power from the electric motor M.

For driving the machine backward or forward at a more rapid rate than when cutting, electric motor 84 may move the endless treads S and T for tramming, as the more rapid movement is called. A conveyor H carries the cut material from the front bottom to the top rear of the machine where it is emptied by gravity into a vehicle K to be conveyed to the mouth of the opening. A vertical probe or test cutter P is mounted at the forward top of the machine to indicate a change in direction of the coal seam. A horizontal probe or test cutter P' is mounted at the forward side of the machine to indicate a change in direction of the hole horizontally with respect to the adjacent hole. The making of the test probings and the interpretation of the results are under the control of an operator at a remote location. When the vertical probe P detects the strata above the coal seam, the operator outside the hole being cut by the machine is automatically notified of that fact. By remote control the drum cutters B and C may be lowered to deepen the flat ways in the bottom of the hole and head the machine downward. Raising these cutters B and C directs the machine upward. When the horizontal probe P' detects the adjacent hole, the operator outside the hole being cut by the machine is automatically notified of that fact. By movement of the guide shoes F and G the front end of the machine may be laterally shifted to change the direction of cutting in a horizontal plane.

Cutting mechanism

As shown in Figs. 2, 3, 4, 5, 6, 7 and 8, the electric main motor M drives a clutch 1 (Fig. 4), which is engaged to and disengaged from meshed spur gears 2 and 3, by a lever 4, which is in turn operated by remotely controlled solenoids 5 and 6 to provide adequate clutch operating force. The clutch might be operated by a solenoid and spring combination.

The speed of the driven gear 3 is reduced by a conventional planetary transmission 7 (Fig. 5) which drives a shaft 8 carrying a bevel gear 9. Meshing with this bevel gear 9 is a first bevel gear 10 which drives a hydraulic pump 11 for propelling the machine, and a second bevel gear 12 which drives a lubricant pump 13.

To effect further reduction in speed and to transmit the driving force to two counter-rotating members, the shaft 8 is connected to the central gear 14 to a transmission (Figs. 5 and 6). The central gear 14 meshes with four gears 15, 16, 17, and 18, in a cluster, said gears having fixed axes and meshing with a rotatable rim gear 19. The rotatable rim gear 19 is secured to a bell-shaped casing 20 which drives a hollow shaft 21. Each of the gears 15 to 18 of the cluster is on a common shaft with one of four spur gears 22 which mesh with a gear 23 which in turn is keyed to a central shaft 24 within the hollow shaft 21.

Each of the pair of face cutters A is mounted (Figs. 7 and 8) on one of the oppositely rotating shafts 21 and 24, and each receives substantially the same driving torque as the other in order to reduce any tendency for the machine to tilt laterally. The smaller or forward face cutter 25 is driven by the inner shaft 24 and has at its forward end a pilot cutter 26 of the general shape and type illustrated. The several cutting edge tools 27, 28, 29, 30 and others on this front cutter 25 are arranged at different radial distances so that each cuts its own kerf. These edged tools are tipped with tungsten carbide or other wear-resistant material to give long life. The larger or rear face cutter 31 is driven by the outer shaft 21 and carries tools 32, 33, 34 and others, each of which is at a different radial distance from the center and is of the same general type as are the cutters 27, 28, 29, and 30, carried by the oppositely rotating part 25. The cutting tools on both face cutters are preferably arranged to cut a series of concentric grooves in the coal such that the "lands" or area of uncut coal between the tools will break off before the depth of the groove exceeds the protruding length of the tools.

To drive the drum cutters B and C (Fig. 8), a spur gear 35 keyed to the outer shaft 21 (Fig. 5) meshes with a spur gear 36 on a shaft 37 for driving bevel gears 38, 39 and a shaft 40 (Figs. 5 and 9). This shaft 40 is connected in identical fashion for driving each 40 of the drum cutters B and C, therefore, only drum cutter C and its drive have been shown in full in Fig. 9. Shaft 40 drives a bevel gear 41 which meshes with a bevel gear 42 driving a vertical shaft 43 carrying the drum cutter C on which the cutting edge tools are arranged at different elevations. The vertical shaft 43 is provided with a number of elongated splines which allow the shaft to be moved axially up and down through its gear 42. A threaded non-rotatable bushing 44 is carried at the upper end of the shaft 43, engaging an internally threaded worm gear 45. The worm gear 45 is rotatably adjustable, its rotation causing the bushing 44 on the shaft 43 to be raised or lowered, thereby raising or lowering the drum cutter C. A stationary helical resistance coil 46 is engaged by a sliding contact arm 47 carried by the lower end of the bushing 44. The arm 47 is also adapted to engage a limit switch (not shown) at each end of its travel.

Separate motors 48 and 49 (Figs. 2 and 3) are provided for adjusting the height of each drum cutter. Each of these motors drives a pair of bevel gears 50 and 51, and a worm 52, (Figs. 9 and 10) the latter engaging a worm gear 53 on a shaft 54 driving a second worm 55, which in turn engages the worm gear 45 for raising and lowering the drum cutter C.

Fig. 8 shows the general shape of the cross section of the hole cut by this machine, the circular hole made by the end face cutters A being modified by the vertical drum cutters B and C immediately behind the front-end face cutters to produce a hole with a substantially flat bottom and partially parallel side walls.

A machine of the overall dimensions mentioned is capable of cutting at a travel rate of 18 inches per minute, yielding about 600 lbs. of cut coal per foot of machine travel, or a ton for every 40 inches.

The percentage of fines in the product may be decreased by increasing the radial spacing intervals of the cutting edge tools 27, 28, 29, 30, etc. and by increasing the rate of forward advance of the machine. The greater the radial spacing intervals of the tools 27, 28, etc. the larger are the "lands" and pieces of coal broken from them, which tends to decrease the power required for cutting the coal. The rate of forward travel is limited by the capacity of the conveyor H, by the power available, and, over an extended period of time, by the capacity of the car K. The problems of supplying power to the machine and of removing coal cuttings from it impose a practical limit on the depth of holes bored of from 500 ft. to 2500 ft.

Propelling the machine

Referring again to Fig. 5, as the shaft 8 driven by the main motor M rotates, it drives the bevel gears 9 and 10 for driving a hydraulic pump 11 through a shaft 56. Oil pressure from the pump 11 is transmitted through the pipe 57 (Fig. 25) for operating the hydraulic motor N, which in turn drives the endless treads S and T during cutting. Motor N (Fig. 22) drives a worm 58 through flexible shaft 59 for operating a gear 60 on shaft 61 (Fig. 21). From shaft 61 power is transmitted through bevel gears 62 and 63 to a spur gear 64 (Fig. 20) meshing with a gear 65 which drives a clutch 66. Under the action of the remotely controlled solenoid 68a, shown in Fig. 20, the sliding clutch part 68 engages clutch part 66 and thereby connects the shaft 67 with the spur gear 65.

The driven shaft 67 drives the central or spur gear 69 of a conventional planetary transmission 70 which in turn drives a shaft 71, a worm 72, and a worm gear 73 (Fig. 20). The worm gear 73 and its shaft 74 drive spur gears 75 and 76 (Fig. 23). These spur gears 75 and 76 are meshed with larger spur gears 77 and 78, each mounted on a hollow shaft 79 (Fig. 24 which shows only one, the other being identical) to which a tread-driving rear sprocket 80 is affixed. Each hollow shaft 79 is supported by bearing 81 and 82 in conventional manner upon a fixed central shaft 83.

To propel or tram the machine backwards or forward, motor power is drawn from a reversible electric motor 84 (Fig. 20) by urging the sliding clutch part 68 to the left by means of the remotely operable solenoid 68b. This disengages clutch 66 and engages clutch 86, thereby disconnecting the central shaft 67 from the spur gear 65 and connecting the shaft 67 to the shaft 85 of the electric motor 84. As this operation cuts out part of the speed-reducing gear train, i. e. the worm 58 and gear 60 and the spur gears 64 and 65, driven by the hydraulic motor N, tramming proceeds at a considerably greater speed than with propulsion under hydraulic power.

The forward sprocket wheel 87 (Fig. 2), around which the caterpillar treads pass, may be, but ordinarily need not be driven by a motor. Springs 88 are located to receive some of the forward weight of the machine. Vertical motion of the forward end of the machine is accommodated by a corresponding angular displacement of the carriage about the rear shaft 83.

Conveying cut coal

Coal cut by the cutters A, B, and C, drops to the floor of the hole, where it is promptly picked up by an endless conveyor H which carries it backwards under the main body of the machine, thence up to the top rear of the machine where it drops the coal into a coal car K or other conveyance which removes the coal to the mine mouth (Figs. 2, 2a, 3, and 3a). The conveyor H is a conventional chain or belt design, preferably provided with flights or scoops, and is driven by the same electric motor 84 as is used for driving the tractor treads S and T during tramming.

The motor 84 drives a clutch 86 (Fig. 20), which is disengaged when the tractor treads S and T are not to be driven. The shaft 85 of the motor 84 is connected, as by silent chain drive 89, to a pair of flexible shafts 90 and 91, which lead (Figs. 2a and 3a) to a pair of gear boxes 92 and 93, both of which drive a sprocket 94 which in turn engages the chain 95 of the conveyor H. Preferably, frangible couplings (not shown) are used between the flexible shafts 90 and 91, and the gear boxes 92 and 93.

A front shroud 96 (Figs. 2 and 3) extends substantially entirely across the hole being formed except for the conveyor openings to keep flying particles of coal from entering between exposed moving parts of the machine. Pieces of coal are directed downward by gravity and oppositely rotating drum cutters B and C direct the cut coal forwardly and inwardly onto the conveyor H. The cross plates or flights of the conveyor feed the cut coal rearwardly past the rear end of the machine, as shown in Fig. 2a, until it reaches sheave 97 of the conveyor H, after which it falls into the coal car K. The lower and forwardly moving course of the conveyor at the rear end portion may function to feed coal forward from the discharge point and thereby fully load the car.

A flexible cable 99 driven from outside the hole being cut passes around the sheave 98 on the rear of the mining machine and said cable is attached to the coal car K, so that this car may be rolled in and out of the hole being cut. The forward end of the car K is provided with a bumper 100 which is kept in firm abutment against the rear of the machine while the car is being loaded. Graduations on one of the cables attached to the machine or on the cable 99 may indicate to an operator how far the machine has progressed, and thus when sufficient coal has been mined to fill the car. For the particular size operation being described, coal may be conveyed out of the hole at the rate of about 15 tons of coal per hour.

To permit the machine to cut a hole whose axis bends vertically on a short radius, the conveyor H is hinged at 101, the rear portion normally being maintained in raised position by a pair of hydraulic jacks 102 and 103 (Figs. 2a, 3a, and 25).

Guiding in a vertical plane

Whether the machine is level or nosed up or down depends upon whether the shoes D and E (Fig. 2) rest upon a portion of the floor at, above, or below the portion supporting the tractor treads S and T. The level of the floor may be changed by raising or lowering the drum cutters B and C, as previously described, and as soon as the shoes D and E reach the changed floor level the tilt of the machine is accordingly altered.

Each drum cutter, for example, drum cutter C (Fig. 9), has associated therewith a resistance coil 46 and a sliding contact 47 mounted on the cutter shaft. The respective resistance coils are connected across a source of current, and voltmeters located outside the hole provide an indication of the potential difference between one end of the respective coils and the corresponding sliding contact. The operator is thus enabled to know the height of each drum cutter, and thus is able to tell from the position of the drum cutters whether these are adjusted so the machine will nose up or down. The resistance coil for each drum cutter may also be connected in a Wheatstone bridge to a galvanometer outside the hole for greater accuracy.

A transverse tilt or twist indicator (Fig. 27) is mounted in the box 141 (Fig. 2a) and permits the operator to determine in due course whether the paths cut by the drum cutters B and C are in the same horizontal plane. If not, he is able to correct any deviation from the horizontal plane by individually adjusting the relative vertical positions of cutters B and C. The twist indicator comprises a transversely swinging pendulum (Fig. 27) having a weight 142 on its stem and carrying a sliding contact 143 movable along an arcuate resistance coil 144. The coil 144 is connected across a source of current, and a voltmeter located outside the hole provides an indication of the potential difference between one end of the coil and the sliding contact. Longitudinal tilt is indicated in a similar manner with the aid of a pendulum swinging longitudinally along arcuate resistance coil 144a within box 141. Knowledge of tilt in the two directions assists the operator in remotely controlling the machine to cut in the coal seam safely away from the strata above and below.

Guiding in a horizontal plane

The machine is guided in a horizontal plane by shoes F and G which bear on the side walls of the hole (Figs. 2 and 3) and which are shifted in unison in a lateral direction relative to the axis of the machine by an electric motor 104 (Figs. 15 to 19).

The motor 104 (Fig. 15) drives a shaft 105 on which is mounted a worm 106 engaging a gear 107 (Fig. 18) having a shaft 108 on which is mounted a worm 109. The last mentioned worm 109 drives a gear 110 on a cross shaft 111, each end of which drives, through bevel gears 112, 113 (Fig. 17) and worm 114, only one such set of gears being shown to avoid confusion. The worm 114 engages a gear 115 rotating on a threaded portion of a thrust and guide bar 116 (Fig. 15). An identical guide bar 117 on the other side of the machine is activated in identical manner from the other end of the cross shaft 111. To prevent rotation of the guide bar 116 or 117 a stop key 118 engages a slot in each (Figs. 15 and 16). The slot end walls cooperate with the stop key 118 to limit the extent of movement of the guide bars 116 and 117 and shoes F and G. A sliding contact arm 119 on the thrust bar 116 is adapted to slide over a resistance coil 120 supplied with current. A voltmeter or other indicator located at the mouth of the hole being cut and connected across one end of the resistance coil and the contact arm indicates to the operator the position of the shoes F and G. He is thus afforded a means for directing the course of the machine in a straight line or in a curve in a horizontal plane. Instead of using the stop keys 118 as the limiting stops, limit switches 121 and 122 may be provided for engagement by the upper end of the arm 119 to limit motion of the shoes F and G in either direction. The operator, by remote control, is thus able to steer the cutting machine in either direction in a horizontal plane as well as in a vertical plane.

Determining position relative to roof

Although the coal cutting machine may be run at a predetermined distance from the floor of the seam, we prefer to run our machine at a predetermined distance from the roof. The reason for this is that a sharper plane of separation usually exists between good coal and stratum at the ceiling than at the base. Where a good plane of separation exists at the base, the machine may if desired be guided thereby. To guide on the ceiling, the operator keeps the machine rising slowly at any time it is more than a predetermined distance from the roof of the seam and causes it to nose down only for a short time after it has reached the said predetermined distance from the roof. To convey to a remote operator the fact that the machine has approached the roof to within the predetermined distance, we have devised several means which may be used separately or together.

Figure 2:
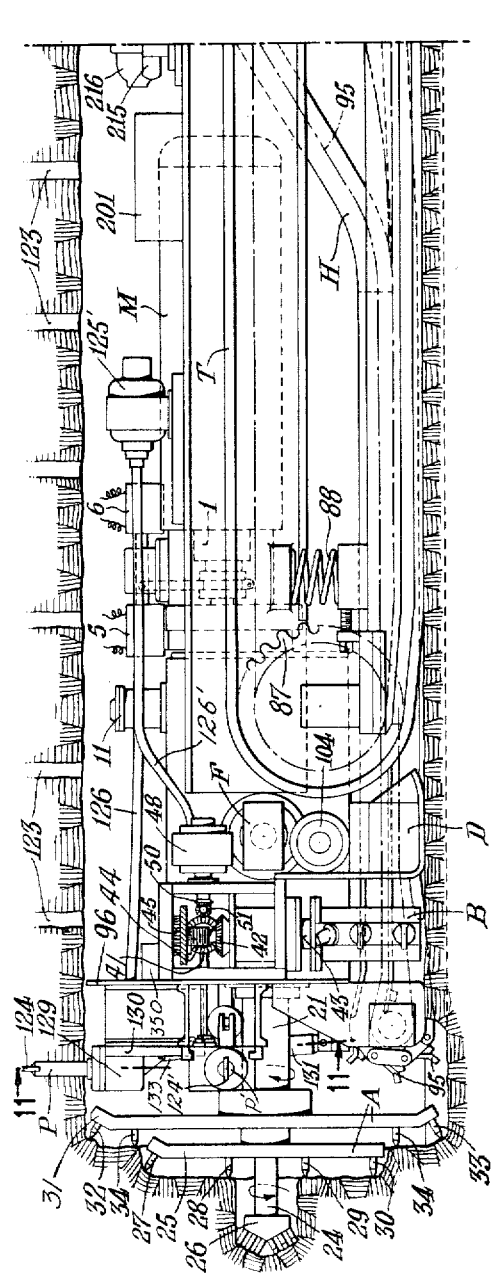
Fig. 2 is a side elevation of the front portion of the mining machine of Fig. 1, on a larger scale and showing more detail.
Figure 2A:
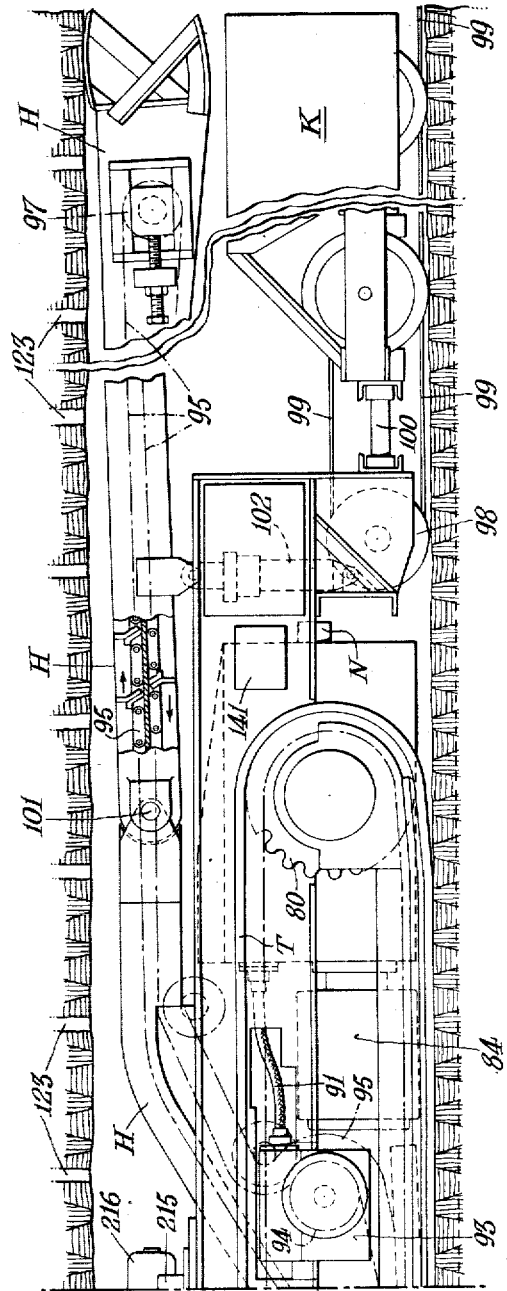
Fig. 2a is a side elevation showing the rear portion of the same machine.

One of the means provided for this purpose is the probe P (Figs. 1, 2, 3, and 11) which at intervals makes borings 123 indicated in Fig. 2. The probe P comprises a drill 124 driven by the electric motor 125 through a flexible shaft 126 and a worm 127 (Fig. 11) engaging worm gear 128 on the probe drill shaft. The crosshead 129 carrying the drill, worm and gear, is vertically slidable along guides 130 by hydraulic pressure in the cylinder 131, raising the piston 132 and crosshead through an upward thrust on the connecting rod 133. A remote indicator of the depth of penetration of the drill may be furnished by a contact arm 134 sliding over a current carrying resistance coil 135. A voltmeter connected between an end of coil 135 and arm 134 may be graduated to indicate depth of penetration of the probe P. The crosshead needs to slide also along horizontal guides, not shown, if the probe of Fig. 11 is to operate while the machine is progressively cutting. In the embodiment illustrated, the probe is provided with no horizontal guides and therefore must operate during the time the machine is stopped, and while the coal car K is being withdrawn, emptied and pulled back to the machine.

The probe drill 124 in practice has been about one and one-half inches in diameter and adapted to go into the coal seam above the ceiling six or eight inches. Should the probe drill strike the ceiling stratum within less than its usual distance of travel, the operator by remote control lowers the drum cutters B and C to direct the operation of the machine downward. Should the drill not strike the ceiling stratum within its usual travel, the operator in practice directs the hole being cut in a slightly upward direction. Should the drill still not strike the ceiling stratum at the next hole drilled, the machine can be directed upwardly at a greater angle and until the ceiling stratum is struck. Thus, the machine is usually directed upwardly or downwardly, always hunting, and seldom directed in a true horizontal direction even though the seam roof be horizontal. The contact of the drill 124 with the ceiling stratum is usually indicated by a sudden increase in electrical current and power consumed by the motor 125 and is revealed to the operator by an ammeter or wattmeter on a control panel before him.

Although this probe drill 124 is illustrated as being mounted for cooperation with only the roof of the hole being cut, it will be understood that such probe drills may also be mounted to engage the bottom or either, such as probe P′, or both side walls of the hole. If a probe drill is used in the floor, the fact that it strikes hard stratum may cause the operator to direct the machine cutting upward in a vertical plane by raising the drum cutters B and C.

When one hole has been cut, it is sometimes desirable to cut a second hole parallel with the first in a horizontal plane. In such event the use of horizontal probe drill P′ in the side wall separating the two holes may suffice to indicate that the second is following the first when the probe drill P′ cuts transversely entirely through a separating wall between the holes, the fact that the drill has passed all the way through being indicated by a reduction in current consumed by the probe driving motor.

As shown in Fig. 11, the hydraulic jack cylinder 131 is pivotally mounted to swing about the axis of the bolt 136 as a center as the crosshead is moved up and down. Hydraulic pressure is transmitted to the cylinder 131 through pipe 137 to the under side of piston 132. The drill is lowered by hydraulic pressure transmitted through pipe 139 to the top of the piston 132 forcing the drill downward. In event hydraulic pressure should fail the spring 140 is strong enough to lower the drill when pressure below the piston 132 has been relieved.

To give an alarm that the front cutters have struck rock, indicating a fault or termination of the coal seam or failure of the probe drill warning, a microphone 350 may be located on the forward portion of the machine, as shown in Figs. 2 and 3. The microphone signal, when suitably amplified, gives a distinctive howling sound indicating to the operator that hard rock has been reached, enabling him promptly to shut off the motor M and the feed of the machine before the front cutters have been dulled excessively.

In Fig. 12 is illustrated a modified type of probe drill 124a adapted for rotation during progressive advance of the machine and the formation of a continuous slot 123a instead of spaced borings 123. The drill 124a is of the sort having cutting edges on both its upper end and sides. This drill is driven through a flexible shaft 126a as before and kept in elevated position by the rod 133a extending above a hydraulic jack, not shown, but of the same type as that shown in Fig. 11 except that the hydraulic jack is adapted to hold the drill in elevated position.

Figs. 13 and 14 disclose yet another type of probe for cutting a continuous slot 123b. A flexible shaft 126b drives the worm 127b which in turn drives gear 128b, on the same shaft with a disc type rotary toothed cutter 138 having its axis in a horizontal plane. As in Fig. 12, the cutter is raised and lowered by a hydraulic jack adapted to exert an upward thrust against the rod 133b to maintain the cutter in an elevated position. The crosshead 129b is directed along the vertical guides 130b.

In both the probes of Fig. 12 and of Figs. 13 and 14, contact of the cutter with the top or bottom of the seam is indicated by an ammeter or wattmeter, the extent of penetration being shown in the manner described for the probe of Fig. 11. When using this continuous type probe, changes in direction in the vertical plane are preferably made at intervals every several feet so as to be aware of the relative position of the roof of the hole and upper boundary of the seam.

Hydraulic system

The hydraulic system of the mining machine, which supplies power for advancing the vertical probe into the strata above or below the coal seam, for advancing the horizontal probe to left (or right) into the adjacent hole for moving the machine forward during the boring operation, and for yieldably supporting the conveyor is diagrammatically shown in Fig. 25. Oil for the system is supplied from a common reservoir 201, the pressure required for advancing and retracting the probe P and for operating the tractor while boring being furnished by the main pump 11. The pressure delivered by this pump to conduits 202 and 57 is preset by a pressure control valve 203 which bleeds off oil through the return conduits 204 and 205.

With reference to the vertical probe, for example, oil under pressure from line 202 is admitted to the port P′ of a 4-way solenoid operated valve 206. This valve is normally held by spring action in such position that port P′ is connected with port 2′ and port 1′ with port T′. The oil pressure existing in conduit 202 is thereby applied to the upper portion of the probe cylinder through conduit 139, thus assisting spring 140 (Fig. 11) in holding the probe in the retracted position. The lower portion of the probe cylinder, in the meantime, is connected to the reservoir through conduit 137, check valve 207, ports 1′ and T′, and conduit 208. When it is desired to advance the probe upwardly into the coal seam, an electric current is passed through the solenoid 212 of valve 206, thus overcoming the internal spring action and causing port P′ to be connected with port 1′ and port 2′ with port T′. Oil passing from conduit 202 and port P′ to port 1′ cannot flow through the check valve in the reverse direction, and hence must flow by way of flow control valve 209 and conduit 137 into the lower portion of the cylinder. Through suitable prior adjustment of the valve 209, it is assured that the probe will advance into the coal at the proper rate of speed. During upward movement of the piston 132, oil from the upper end of the cylinder returns through conduit 139, ports 2' and T', and conduit 208 to the reservoir 201. The probe is retracted simply by interrupting the solenoid current of valve 206, thereby allowing the valve to return to its normal position. In the event of failure of oil pressure, the spring 140 (Fig. 11) within the probe cylinder retracts the probe by mechanical means.

Oil under preset pressure supplied through conduit 57 is used for moving the machine forward during the boring operation. The oil is admitted through ports R and 4' of solenoid valve 210 to the gear motor N, from which it is discharged through conduit 205 into the reservoir 201. The speed of the gear motor N is controlled by an electric motor 213 which operates valve 211 and thereby permits any proportion of the oil flow to be bypassed around the gear motor. The purpose of valve 210 is to avoid creeping of the machine due to a small amount of oil passing through the gear motor N even when the valve 211 is wide open. By actuating the solenoid 214 of valve 210, port R is closed off. If clutch 66 (Fig. 20) is replaced by the type of clutch having intermeshing teeth, the engagement and disengagement thereof can be considerably facilitated by causing port 4' to be simultaneously connected with a port 3', as shown, so as to provide a release for oil pressure within the pump. Inactivating the solenoid returns the valve by spring action to the original position described.

The conveyor support cylinders 102 and 103 may be supplied with oil pressure from the main pump 11 through an auxiliary pressure-reducing valve and solenoid shut-off valve; however, it is generally preferred to use a separate pump 215 driven by an electric motor 216. Pressure in the supply conduit 217 for the cylinders 102 and 103 is preset by bypassing part of the oil flow through conduit 218 in accordance with the setting of pressure control valve 219.

*Electrical system*

The complete electrical system for the mining machine as embodied for operation by remote control comprises power circuits, control circuits, and position indicating circuits. The electrical components and wiring installed on the body of the machine are diagrammatically illustrated in Fig. 26, the lines that terminate in the broken line at the extreme right of the drawing representing cables which pass from the machine to a control station located outside the hole being bored. The connections at the control station corresponding to these cables are depicted in Fig. 26a.

As shown in Fig. 26, the 440-volt three-phase alternating current feeder lines supply power to the motor M driving the face cutters A and drum cutters B and C, the motors 48 and 49 for positioning the drum cutters B and C, the horizontal control motor 104, and the motor 84 used both for tramming and operating the conveyor. Single-phase connections from the 440-volt system are used to supply power for operating the face cutter clutch solenoids 5 and 6, and the tramming clutch solenoids 68a and 68b, and to feed the primary circuit of the step-down transformer 300. The 110-volt secondary of this transformer supplies power to the series-connected 110-volt single phase valve motor 213, the conveyor support pump motor 216, and a tail lamp L. In addition, it energizes solenoids 212, 212' and 214 which control the setting of valves 206, 206' and 210, respectively. Observation of the tail lamp assists in guiding the machine in a horizontal plane, the lamps being preferably mounted at the free end of the conveyor.

Whereas the motor M is connected directly to the 440-volt feeder lines, all other motors, solenoid clutches, and solenoid valves are connected to their respective power supplies through relays. The coils of the relays are supplied with current from a 36-volt direct current line by closing the corresponding switches in the control station. The relays used with all the 440-volt motors, except the horizontal and vertical probe motors, are so connected as to permit reversing the direction of rotation of the motors by interchanging the connections of two of the three phases. The single-phase 110-volt alternating current motor 213 used for adjusting the speed control valve 211 is reversed by conventional means.

The reversible motors and the double-acting clutches may be actuated by pairs of relays controlled by ordinary double-throw switches that remain open in mid-position. However, to facilitate operation it is preferable to use electrically interlocked relays in conjunction with push button switches. In the case of the reversible tramming motor 84 and clutch solenoids 5, 6, 68a and 68b, where the actuation is to be maintained in one direction for a prolonged period of time, the push-button switches (313, 346; 308, 311; 317, 344) are of the well-known type that remain closed until mechanically released by depressing a stop button. Where the action is only momentary, as in the case of the motors associated with drum cutter elevation, horizontal control and speed control, push button switches (324, 329; 325, 330; 336, 337; 340, 341) without the mechanical holding feature are preferred. In both instances the electrically interlocked connection of each pair of relays by which closing the circuit of one relay coil opens the circuit of the other, prevents short-circuiting or opposed activation if switches of opposite control are accidentally closed at the same time.

Since the probes always rotates in the same direction, the three-phase motors 125 and 125' used in conjunction therewith are each controlled by a triple-pole single-throw relay. The clutch solenoids 5 and 6 for operating the face cutters, as well as the clutch solenoids 68a and 68b for selecting either hydraulic or electric traction, are operated from one phase of the three-phase 440-volt line through 36-volt interlocking relays (309, 312 and 319, 345) of the double-pole single-throw type.

The devices for indicating probe depth, drum cutter position, horizontal control position, longitudinal tilt and transverse tilt all comprise in each case a resistance coil connected across the 36-volt direct current power supply, and a movable slider responsive to the variable in question. The potential difference between the slider and one end of the resistance is indicated on a suitably calibrated voltmeter in the control station. Since the drum cutters B and C, and the horizontal pressure feet F and G are shifted by motor drive, limit switches in these instances are provided adjacent to the end of the resistance coils. When the slider contacts a limit switch it automatically opens that circuit which would otherwise permit further movement of the slider in the same direction. The power consumed by the probes provide an indication of the type of materials being encountered, and their relative magnitudes are revealed by wattmeters, preferably of the recording type, located in the control station and connected in the usual manner to two of the three phases supplying the probe motors.

*Operation*

The procedure to be followed in mining coal with the machine of the invention may best be described as applied to surface entry mining, although it will be realized that the machine is in no manner limited to this particular field of application.

Surface entry mining refers to the mining of minerals, for example, coal, by entry through outcroppings at the surface. Coal is the final result of a sedimentary deposit of organic matter and consequently is found to exist in generally horizontal strata. Outcroppings of such horizontal strata are usually observed on the inclined faces of land masses that have been raised above the surrounding terrain, or that have remained in place after adjacent land has been washed away.

Once an outcropping of coal has been located, for example, on the side of a hill, the seam is made accessible for machine mining by excavating a ledge 353, Fig. 28. This exposes a vertical face 354 of the seam and at the same time furnishes a location for a horizontal working platform. For a mining machine of the dimensions described, the platform should be about 30 ft. to 40 ft. wide and about 3½ ft. below the roof of the seam. Under these conditions the machine can be readily maneuvered into position with its longitudinal axis substantially parallel with the axis of the seam and with the topmost cutting edges of the disc cutters about 6 inches below the upper boundary 355 of the coal seam. Although a smaller depth of coal may be allowed to remain between the roof 356 of the hole and the overlying stratum, a minimum of 4 inches is generally preferred. This is usually sufficient to allow for any lag in executing the most abrupt downward change in course that may be necessary and entails only a negligible sacrifice in unmined coal.

A platform 351, Fig. 28, is desirable as a site for the control station 352, and for the equipment needed in moving the coal car K in and out of the bored hole, and for the unloading thereof. A winch controls the cable 99 (Fig. 2a) maintaining it under tension while it is being unwound at the same rate as the advance of the machine, so that it serves to hold the coal car firmly against the rear of the machine while it is moving forward during cutting. The other end of the cable is attached to the rear of the coal car, and, upon reversing the rotation of the winch, withdraws the car from the bore.

While the endless tracks of the machine described always operate in unison, it is understood that the maneuverability of the machine outside the hole may be considerably improved by operating each track by means of a separate motor and control. Again, if many holes are to be bored each adjacent to another, it may prove advantageous to lay a track 357 parallel to the coal face and to start the boring operation in each instance by the machine from a platform 351 mounted on a carriage that may be moved along the tracks from one position to the next as indicated in Fig. 28.

Assuming that the machine has been set in position with its longitudinal axis substantially horizontal and directed along the course to be followed, provisions may be made for maintaining a linear course in a horizontal plane by driving two stakes into the ground behind the machine and establishing a line of sight between them and a tail light at the rear end of the conveyor. Any deviation in the horizontal course of the machine as revealed by the tail light departing from the line of sight may then be corrected through manipulation of the horizontal control switches in the station.

Referring now to Figs. 26 and 26a, the operator first closes the 36-volt line switch 301 in order to supply power to all control and indicating circuits. The probe P being in the retracted position, the corresponding voltmeter 302 indicates zero. The drum cutters B and C, being normally set for a horizontal course by having the bases thereof in line with the guide shoes, cause the corresponding voltmeters 303 and 304 to assume a mid-scale deflection representative of zero deviation. A similar mid-scale deflection indicative of zero deviation is exhibited by voltmeters 305, responsive to horizontal control; 306, responsive to lateral inclination; and 307, responsive to longitudinal inclination.

Before starting the motor M, the operator disengages the end face and drum cutters from the motor shaft by depressing push button 308, which energizes relay 309 and thus causes solenoid 5 to disengage the clutch 1 (Fig. 4). Having thus removed the load from the motor, the operator closes the main 440-volt switch 310, thereby immediately starting the motor M, which is directly connected to the supply lines. At the same time the 110-volt transformer 300 becomes energized and supplies current to the tail lamp L. The cutters are started next by depressing push-button switch 311, which energizes relay 312 and solenoid 6 and de-energizes relay 309 and solenoid 5. The motor M, which is now rotating, thereby is caused to engage the drive shaft operating the cutters A, B and C, the lubricating pump 13, and the oil pressure pump 11 (Fig. 5). Next, the operator starts the conveyor by closing push-button switch 313 which energizes relay 314. This connects the three line phases in such fashion to the conveyor motor 84 that the motor rotates in a direction which will move the coal to the rear of the machine.

Following this, the operator applies hydraulic pressure to the conveyor supports by closing switch 315 which energizes relay 316 and supplies power to the conveyor support pump motor 216. This brings the end of the conveyor to a height slightly above that of the uppermost disc cutters, so that once the conveyor is fully within the hole it will always be in contact with the roof. This provision allows the coal car to be moved in and out under the conveyor even when the bore should assume an upward curvature.

With the cutters and conveyor in operation, the operator advances the machine into the exposed face of the coal seam by depressing push-button switch 317, which energizes relay 319 and solenoid 68a and thereby engages the normally disengaged clutch 68 (Fig. 20) with the hydraulic drive of gear motor N.

As the machine progresses, the fragmented coal that drops to the floor under the cutters is progressively fed into the mouth of the conveyor by the advance of the machine and by the inward rotation of the vertical drum cutters. The conveyor carries the coal upwardly and rearwardly and deposits it in the coal car which is maintained in abutting relation with the rear of the machine during its advance. The coal first accumulates in a pile at the rear of the car. When the pile assumes such proportion that it reaches the forwardly moving flights on the underside of the conveyor, the flights begin to level off the pile pushing the coal in a forward direction and this process continues until the car is completely filled. In the meantime, the operator has observed, by means of suitable markings placed at intervals on one of the cables attached to the machine, how far the machine has progressed into the seam during the filling of the car. This distance is carefully noted as it is proportioned to the coal mined and hence, by its cooperation with some stationary reference mark, affords a means of telling when it is time to stop the machine and empty the car. At such times the car is withdrawn from the bore hole simply by reversing the direction of the winch.

The intervals during which the coal car is being withdrawn, emptied, and returned to the bore hole are conveniently used for establishing the location of the roof of the hole with respect to the overlying stratum. Having stopped the machine by depressing the mechanical release button (not shown) associated with push-button switch 317, thereby returning clutch 68 to its neutral position, the operator closes switch 320 which energizes relay 321 and supplies three-phase power to the probe motor 125. With the probe P in rotation, the operator closes switch 322 which energizes relay 323 and thus causes solenoid 212 to alter the setting of valve 206 so as to exert upward pressure against the probe P, which in the present instance is assumed to be of the drill type shown in Fig. 11. The energy consumed by the drill is proportional to the resistance encountered, so that, whereas a steady reading will be indicated on the wattmeter 328 as long as the drill advances through coal, there will be a sudden change in the indicated value when a material of different characteristics is encountered. Thus an overlying layer of rock will cause a sudden rise in value, whereas soft clay or a void will be revealed by an equally sudden drop.

The depth of penetration of the probe is continuously indicated by the voltmeter 302. At the end of the stroke, or when the wattmeter indicates a different stratum has been encountered, the operator withdraws the probe by opening switch 322, thereby allowing valve 206 to return to its original position. The horizontal probe P' is similarly operated to indicate the thickness of a lateral wall when the probe breaks through the latter, leaving spaced holes 123' in such wall.

Assuming that no change in the wattmeter reading is apparent during the full stroke of the probe P', for example, or during any lesser value of roof thickness considered permissible, the operator knows that the machine is either following a course parallel to the upper seam boundary or is heading away therefrom. In order to insure that the latter is not taking place, he proceeds deliberately to head the machine toward this boundary by slightly raising the drum cutters B and C. This is done by depressing push-button switches 324 and 325 which energize relays 326 and 327, respectively, and connect motors 49 and 48 to the three-phase supply in such manner as to cause the drum cutters to be elevated. Usually about ⅛ of an inch elevation of the base of the cutters above the guide shoes is sufficient, and, when this amount is reached, as indicated by voltmeters 303 and 304, the operator depresses the mechanical release button (not shown) associated with switches 324 and 325, and thereby stops the motors 49 and 48.

As long as the drum cutters remain in the elevated position, the machine continues to ascend at an ever increasing rate since the new tracks are always above the level of the guides that follow. This increasing longitudinal tilt is revealed to the operator by a rising indication on the voltmeter 307 connected to the tilt indicator V. The desired amount of tilt is usually that amount which is calculated to bring the probe into contact with the overlying stratum at the next test point, i. e. at the next station, for emptying of the coal car. At the indication of the voltmeter corresponding to the desired angle of tilt, the operator proceeds to prevent further change in upward inclination by returning the drum cutters to their normal position. This he accomplishes by depressing switches 329 and 330 to energize relays 331 and 332. The power supplied to motors 49 and 48 is now reversed in phase sequence and the drum cutters are moved downward until stopped by the operator when the voltmeters 303 and 304 have returned to zero at the mid-position of the scale. The motors are stopped merely by depressing the mechanical release button (not shown) associated with switches 324, 329 and 325, 330.

If the base of the bored hole is not of uniform hardness, or if there is a slight difference in sharpness of the cutting teeth at the base of the drum cutters, the tracks for the guide shoes may assume a greatly extended spiral form with the result that the machine acquires a lateral tilt. The operator is readily informed of any such lateral deviation of the machine by observing voltmeter 306, which is connected to the transverse tilt indicator U. When such deviation becomes apparent, he raises or lowers one of the drum cutters with respect to the other by the desired amount and for as long as is necessary to overcome the difficulty.

Assuming, now, that the machine is headed in an upwardly inclined direction and fully within the seam, the operator observes that it has progressed sufficiently far to fill the coal car. Accordingly, he brings the machine to a stop by closing switch 334, which energizes relay 335. Current passing through solenoid 214 causes the latter to change the setting of valve 210 so as to shut off the flow of oil to the gear motor N.

The operator now repeats the probing procedure in the manner already described. If there is still no indication of the boundary within the desired minimum depth of penetration, he may decide either to continue along the same upwardly inclined course, or to alter the slope still further by again raising the drum cutters over a short distance of travel. On the other hand, if the wattmeter reveals a sudden change in energy consumption, within the desired minimum depth of penetration of the probe, he knows that he has approached too close to the boundary of the seam. Under these circumstances, when the empty coal car has been returned to the machine and the machine started, he lowers the drum cutters by depressing push-button switches 329 and 330 until the voltmeters 303 and 304 indicate that the desired downward displacement of the drum cutters has been secured. Again, when the voltmeter 307 indicates a satisfactory angle of tilt, he returns the drum cutters to their normal position.

From the above it will be noted that the general procedure, according to the method of the invention, is to head the machine toward the seam boundary when the roof of the hole being bored is found to be more than a predetermined distance from the boundary, and away from the boundary when the roof is found to be less than this distance from the boundary.

When the bore hole has progressed a considerable distance, the possibility exists that the machine has deviated to a slight extent in the horizontal plane due to mechanical irregularities or non-homogeneity of the seam. To determine the extent of such deviation the operator at intervals checks the location of the tail light with respect to a line of sight along the reference stakes. In the event that the tail light, visible deep within the bore hole, is found to have veered to the right or left of an original line of sight parallel to a previous hole, the operator proceeds to apply a lateral force to the machine as it advances, through actuating the horizontal control motor 104 in the proper direction. Thus, by depressing either push-button switch 336 or 337, and thereby actuating either relay 338 or 339, he is able to force the machine nearer to the left wall or to the right wall as desired. Such sidewise pressure need, of course, be applied only for a brief period of time. Similarly correction is made in making the second and subsequent bore-holes, according to the thickness of the wall between the hole being bored and the next preceding hole which is checked by operating the horizontal probe P' in the same way as that described for the vertical probe P.

Should the coal seam exhibit a considerable variation in hardness, it may be desirable to alter the forward speed of travel. This the operator may do by momentarily depressing either of push-button switches 340 or 341, which actuates either relay 342 or 343 and causes motor 213 to increase or decrease the oil flow through valve 211.

When it is desired to withdraw the machine at the end of the seam, or, for example, for the purpose of replacing the cutter teeth, the operator first stops the machine by closing switch 334. He then raises the drum cutters to a level above the guide shoes and centers the horizontal control in the manner already explained. Next he withdraws the coal car by means of the external winch, and stops the conveyor by depressing the stop button associated with push-button switch 313. Finally the operator reverses the carriage by releasing push-button switch 317 which releases relay 319 and clutch solenoid 68a, and depresses push-button switch 344 which energizes relay 345 and solenoid 68b. This engages motor 84 with shaft 67, so that by closing switch 346, thus energizing relay 347, motor 84 drives tracks S and T in a direction to cause the machine to back out of the hole.

The machine is returned to the bore hole at tramming speed by depressing push-button switch 313 to energize relay 314. The resulting reversal of phase sequence in the power fed to the tramming motor 84 causes it to change its direction of rotation.

A second hole may be bored adjacent to the first hole in similar manner, care being taken to leave enough wall thickness between the two holes to provide adequate support for overburden. If the first hole has been kept accurately aligned in a horizontal direction, the second hole may be spaced at a constant distance from it by aligning a new set of reference stakes furnishing a line of sight parallel to the original line.

If the course of the first hole along the horizontal plane is tortuous so that it is impossible to insure parallelism of the second hole to the first one by the line-of-sight method, the probe cutter P' is, as pointed out above, advantageously mounted at the side of the machine facing the adjacent hole. The probe P' in this case should be sufficiently long to penetrate the intervening wall at the minimum permissible thickness, the occurrence of such penetration being revealed to the operator by a sudden drop of the reading of wattmeter 328'. General parallelism to the adjacent hole is secured by a similar "hunting" procedure as was followed in the case of the upper boundary, except that deviation of the course in the present instance is effected by the horizontal control motor instead of by the drum cutters. The laterally mounted probe P' may, of course, be used either along or in conjunction with the vertical probe P. A probe may also be used at the bottom of the hole.

*Advantages*

Among the outstanding advantages of this machine is the provision of safety to human life afforded by the fact that no operator need enter the mine. With no operator at the machine, the usual expense for ventilation of a long hole becomes unnecessary. Furthermore, the absence of an operator in the mine removes the necessity for timbering the hole being cut, thus completely eliminating the time and expense involved for this non-productive step of the mining operation. The cutting, loading and hauling of coal to the control point in an integrated and essentially continuous operation is conducive to high production rates at low labor costs.

The machine may readily be made impervious to water by sealing the bearings and electrical conduits and consequently may be moved through deep accumulations of water without harm. However, the speed of boring usually permits the hole to be completed and the machine withdrawn while the hole is still relatively dry.

The feature of utilizing the returning motion of the conveyor flights to spread the coal pile in a forwardly direction eliminates the need for providing closely controlled relative motion between the machine and the coal car during loading. An ordinary power winch is sufficient in the present instance to supply motive power for the coal car.

Furthermore, the articulated support for the conveyor, and the fact that the guide shoes D and E are close to the drum cutters B and C allow the machine to be moved around curves of relatively small radius in a vertical plane without difficulty. Thus, with a machine of the dimensions described, a maximum elevation of the drum cutters above the guide shoes of ⅜ in. causes the machine to ascend one foot in twelve feet of travel.

Although the machine has been described as being controlled by an operator in response to indications furnished by electrical measuring instruments, it is to be understood that the invention also applies to embodiments wherein the indicating system is wholly or in part associated with the control system so as to provide a desired degree of automatic operation.

Features disclosed herein are covered by our copending continuation-in-part application, Serial No. 353,932, filed May 11, 1953, for "Remotely Controlled Mining System."

What is claimed is:

1. A system of mining comprising, in combination, a remotely controlled self-propelled mining machine, means for transporting the material being mined by said machine to a desired place, a control station remotely located with respect to said machine, apparatus means carried by said machine for determining the relative position thereof, means for transmitting signals responsive to said position determining means to said station, means at said station responsive to such signals, machine steering control means at said station, steering means associated with said machine, and means for activating said steering means in response to operation of said machine steering control means.

2. A system of mining as defined by claim 1, in which the machine position determining means comprises means for measuring the distance between said machine and a selected boundary.

3. A system of mining as defined by claim 2, in which said boundary distance measuring means comprises at least one probe drill.

4. A system of mining as defined by claim 2, in which said boundary distance measuring means comprises a rotary toothed cutter.

5. A system of mining as defined by claim 2, in which the remote control station is provided with control means for operating said boundary distance measuring means.

6. A system of mining as defined by claim 2, in which the boundary determining means comprises means responsive to the relative hardness of a selected earth stratum.

7. A system of mining as defined by claim 1, in which said machine position determining means comprises level responsive means.

8. A system of mining as defined by claim 1, in which a launching platform is provided for said machine, and means is provided for moving said platform laterally with respect to the normal direction of mining of such machine, with the machine resting thereon.

9. A system of mining comprising in combination, a remotely controlled self-propelled mining machine having a movable steering element, means for transporting the material being mined by said machine to a desired place, a control station remotely located with respect to said machine, apparatus means carried by said machine responsive to the relative position of such movable element, means for transmitting signals from said element position responsive means to said station, means at said station responsive to such signals, machine steering control means at said station, and means for activating said movable steering element in response to operation of said machine steering control means.

10. A system of winning geological strata material comprising, in combination, a remotely controlled self-propelled bore mining machine having a front face cutter for producing a bore-hole into geological strata, a device for transporting the mined material through the bore being mined by said machine to a desired place outside of such bore, a control station also located outside of the bore, a probe carried by said machine for probing the wall of the bore made by said machine for determining the relative position of said bore with respect to a preselected boundary of said strata, a motor for operating said probe, an electrical circuit connected to said motor for conducting signals responsive to the relative torque of said motor to said station, a meter at said station connected to said circuit and responsive to such signals, a machine steering control element at said station, a power steering mechanism associated with said machine, and an electrical circuit for activating said steering mechanism in response to operation of said machine steering control element.

11. Process of mining selected underground strata of earth material which comprises boring into such material and forming a bore-hole with an advancing bore-hole end face, removing the resulting borings from said face through the bore-hole to a point outside thereof, automatically determining substantially at the end face of the bore hole and signalling to a remote control station outside of the bore-hole the relative position of the bore-hole end face with respect to an adjacent boundary of the strata of earth material being mined while the end face of the bore-hole is within the strata, and during the boring operation controlling from said control station the direction of advance of said bore-hole end face in accordance with the automatic signals received at said control station.

12. Process of mining as claimed in claim 11, which is repeated to make successive adjacent bore-holes in the earth material and during the boring of a succeeding hole automatically determining and signalling the relative position of the bore-hole end face with respect to the wall of a preceding bore-hole.

13. A system of mining earth material comprising, in combination, a remotely controlled self-propelled mining machine for boring into the earth, means for transporting the material being mined by said machine to a location outside the resulting bore-hole, a control station located outside such bore-hole, electro-mechanical means carried by said machine for determining the position of said machine in said earth material and initiating signals corresponding to such position, signal receiving means at said control station, signal transmission means connected between such electro-mechanical position determining means and the signal receiving means, a machine steering control element at said control station, a power steering mechanism associated with said machine and means for transmitting steering impulses from said steering control element to said steering mechanism.

14. Process of mining material from selected strata in the earth which comprises boring into the selected strata, removing the resultant borings from the face of the bore through the bore hole made by the boring operation to a point outside of such bore hole, automatically sensing adjacent the face of the bore hole the relative position thereof with respect to a boundary of the selected strata while the face of the bore hole is within the strata, automatically signalling to a control station outside the bore hole the relative position of such face, and during the boring operation controlling the direction of the boring from such remote control station in accordance with such signals.

15. Process of mining as defined by claim 14, in which the bore-hole extends into such strata from an upstanding face prepared by excavation.

16. A process of mining according to claim 14 in which the selected strata comprise a coal seam.

17. Process of mining coal from a selected seam thereof which comprises boring into such coal seam, removing the resultant coal borings from the face of the bore, through the bore hole made by the boring operation, to a point outside of such bore hole, electro-mechanically sensing adjacent the face of the bore hole the relative position thereof with respect to a boundary of the coal seam while the face of the bore hole is within the seam, signalling to a control station outside the bore hole such relative position of such face, and during such boring operation controlling the direction of the boring in accordance with such signals from such remote control station.

18. The method of operating a self-propelled mining machine from a station that is outside of the mine and remote with respect to the site of operation of the machine, which comprises advancing such machine into selected geological strata, thereby forming a hole in such strata within which the machine conceals the mine face, mechanically removing the material mined by the machine through such hole, automatically sensing the relative position of the hole adjacent such mine face with respect to a boundary of the strata while the machine is within such strata, transmitting signals responsive thereto to such station, and remotely controlling the subsequent course of said machine at said station in response to such signals.

References Cited in the file of this patent

UNITED STATES PATENTS

| 956,463 | Wittich | Apr. 26, 1916 |
| 1,225,784 | De Roode | May 15, 1917 |
| 1,229,418 | De Roode | June 12, 1917 |
| 1,388,545 | Bohan | Aug. 23, 1921 |
| 1,408,720 | Breton et al. | Mar. 7, 1922 |

(Other references on following page)

UNITED STATES PATENTS

| | | | |
|---|---|---|---|
| 1,411,896 | Anschutz-Kaempfe | Apr. 4, | 1922 |
| 1,534,462 | O'Toole | Apr. 21, | 1925 |
| 1,888,085 | Humbel | Nov. 15, | 1932 |
| 2,083,834 | Galuppo et al. | June 15, | 1937 |
| 2,320,196 | Roe | May 25, | 1943 |
| 2,329,875 | Cartlidge | Sept. 21, | 1943 |
| 2,384,397 | Ramsay | Sept. 4, | 1945 |
| 2,387,159 | Lee | Oct. 16, | 1945 |
| 2,620,386 | Alspaugh et al. | Dec. 2, | 1952 |

FOREIGN PATENTS

| | | | |
|---|---|---|---|
| 667,538 | Germany | Nov. 14, | 1938 |

OTHER REFERENCES

"Rock Drilling" WPA Nat'l. Research Project, Report No. E-11, February 1940, page 3.

"Coal Age," December 1948, pages 76 and 77.